United States Patent Office 3,723,320
Patented Mar. 27, 1973

3,723,320
FUNCTIONAL FLUID COMPOSITIONS CONTAINING EPOXIDE STABILIZERS
John F. Herber, St. Louis, and Robert W. Street and William R. Richard, Jr., Kirkwood, Mo., assignors to Monsanto Company, St. Louis, Mo.
No Drawing. Continuation-in-part of application Ser. No. 210,165, Dec. 20, 1971. This application Mar. 27, 1972, Ser. No. 238,666
Int. Cl. C09k 3/00; C10m 3/40
U.S. Cl. 252—78                 14 Claims

ABSTRACT OF THE DISCLOSURE

Functional fluid compositions comprising a major amount of a base stock material which is an ester or amide of an acid phosphorus, a di- or tricarboxylic acid ester, an ester of a polyhydric compound or mixtures thereof, optionally minor amounts of other base stock materials or base stock modifiers such as viscosity index improvers, cavitation damage inhibitors, and lubricity agents, and an additive amount of an acid scavenger and corrosion inhibitor which is a monoepoxycyclohexyl compound such as $C_{1-4}$ alkyl-3,4-epoxycyclohexane carboxylate. The compositions are particularly useful as aircraft hydraulic fluids.

CROSS REFERENCES TO RELATED APPLICATIONS

This application is a continuation-in-part of Ser. No. 210,165 filed Dec. 20, 1971 and now abandoned.

BACKGROUND OF THE INVENTION

Field of the invention

This invention relates to functional fluid compositions, particularly hydraulic fluids and to monoepoxycyclohexyl compounds which are effective to inhibit acid buildup in such fluids.

Description of the prior art

Functional fluids have been utilized in many different types of applications such as electronic coolants, diffusion pump fluids, lubricants, damping fluids, bases for greases, power transmission and hydraulic fluids, heat transfer fluids, heat pump fluids, refrigeration equipment fluids and as filter mediums for air-conditioning systems. Of these uses, hydraulic fluids intended for use in the hydraulic system of aircraft for operating various mechanisms and aircraft control systems must meet stringent functional and use requirements. One of the most important requirements for an aircraft hydraulic fluid is that the fluid be chemically stable to resist oxidative and thermal degradation which can result in the formation of acids and the corrosive attack of metals in contact with the hydraulic fluid.

In order to control the degree of acid buildup during use of the fluid and inhibit corrosion of the components in the hydraulic system, it is conventional to add certain acid scavengers and/or corrosion inhibitors to the hydraulic fluid base stock.

Although a variety of compounds have been suggested for use as corrosion inhibitors, acid acceptors which act as proton acceptors and prevent the buildup of corrosive acids in the fluids when they undergo decomposition under prolonged use at high temperatures are generally preferred. A particularly preferred class of such materials comprises epoxy compounds, especially epoxidized naturally occurring materials such as epoxidized unsaturated glycerides including epoxidized soybean oil, epoxidized castor oil, epoxidized linseed oil, epoxidized fats and the like. Other suggested materials include epoxy esters such as butylepoxyacetoxystearate, glyceryl triepoxyacetoxystearate, isooctylepoxystearate, epoxidized isooctyl phthalate and the like. Also suggested are various alkyl and arylalkyl epoxides such as epoxy decane, epoxy hexadecane, epoxy octadecane, cyclododecane, and the like, and glyceryl and various glycidyl ethers such as phenyl glycidyl ether, glycidyl cyclohexyl ether, alkyl glycidyl ether, and the like.

More recently it has been suggested that a particular class of epoxy compounds, the 3,4-epoxycycloalkyl-3,4-epoxycycloalkyl carboxylates, are particularly useful as acid acceptors for hydraulic fluids and are more effective than the epoxy compounds used heretofore. A particularly preferred compound is 3,4-epoxycyclohexylmethyl-3,4-epoxycyclohexane carboxylate. These compounds are well known chemical entities which have been used as acid scavengers for chlorinated diphenyl dielectric fluids prior to their introduction as inhibitors for hydraulic fluids.

Although 3,4-epoxycycloalkyl-3,4-epoxycycloalkyl carboxylates are effective acid scavengers for common hydraulic fluid compositions, they have a serious inherent disadvantage in that they cause resinous deposits to form around the fluid pump shaft at the point of seal. While these resinous deposits may derive from various causes, one apparent source is from the combination of the epoxide stabilizer with viscosity index improvers also present in the fluid. The formation of deposits is of particular concern in aircraft hydraulic systems which operate under pressure and where the deposits soon result in serious fluid leakage through the seal. The problem of shaft seal leakage is of sufficient magnitude that the aircraft industry and aircraft hydraulic fluid manufacturers have actively sought alternative acid acceptors which are as effective and efficient as the 3,4-epoxycyclohexylmethyl-3,4-epoxycyclohexane carboxylate but which do not have the deposit and leakage problem associated with this material.

It is accordingly an object of this invention to provide an acid acceptor effective to prevent acid buildup in functional fluid compositions. Another object of this invention is to provide an acid acceptor which can be used without adverse secondary effects in functional fluids which may also contain a polymeric V.I. improver. A further object of this invention is to provide functional fluid compositions which are resistant to thermal and oxidative degradation and which are suitable for use in aircraft hydraulic systems. It is a yet further object of this invention to provide an aircraft hydraulic fluid containing a polymeric V.I. improver and an epoxide acid acceptor which does not cause pump shaft seal leakage. Yet further objects will be apparent from the following description of the invention.

SUMMARY

Functional fluid compositions of this invention comprise a major amount of at least about 50 percent by weight of a base stock material selected from the group consisting of esters or amides of an acid of phosphorus, di- or tricarboxylic acid esters, esters of polyhydric compounds and mixtures thereof, from 0 to minor amounts of one or more other base stock materials or base stock modifiers, and from about 0.1 to 10 percent of a monoepoxycyclohexyl compound having the structure

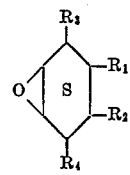

wherein $R_1$ is $-(CH_2)_{0-3}-C(O)OR$, $-C(O)R$, $-OR$, or $-CH_2OR$ where $R$ is an alkyl radical having from 1 to about 12 carbon atoms, $R_2$ is $R_1$, hydrogen, or an alkyl radical having from 1 to about 9 carbon atoms, and $R_3$ and $R_4$ are individually hydrogen or an alkyl radical having from 1 to about 4 carbon atoms. Particularly preferred compounds are butyl-3,4-epoxycyclohexane carboxylate and 3,4-epoxycyclohexyl methyl acetate. The compositions may include polymeric V.I. improvers and other conventional additives and are particularly useful as aircraft hydraulic fluids.

DESCRIPTION OF PREFERRED EMBODIMENTS

The functional fluid compositions of the present invention comprise as the essential components a base stock material and an epoxy compound. The concentration of the epoxy compound in the functional fluid is adjusted according to the demands of the system and nature of the base stock being employed in order to provide compositions which contain sufficient amounts of epoxy material to inhibit acid buildup during normal operation. It has been found that the concentration of epoxy compound required to inhibit and control acid buildup in a particular base stock varies according to the composition of the base stock or blends of base stocks. It has generally been found that preferred additive levels of epoxy compounds are from 0.10 weight percent to 5.0 weight percent, although concentrations of 10 percent or higher are also effective and may be used. Thus, included in the present invention are functional fluid compositions comprising a base stock material and an epoxy material in a concentration sufficient to control and inhibit acid buildup in the base stock. The fluid compositions of this invention can be compounded in any manner known to those skilled in the art for incorporating an additive into a base stock, as for example by adding the epoxy compound to the base stock with stirring until a uniform fluid composition is obtained.

As described above, suitable epoxy materials are the monoepoxycyclohexyl compounds and alkyl-substituted monoepoxycyclohexyl compounds including for example epoxycyclohexane carboxylates, examples of which appear below; dialkyl esters of epoxycyclohexane dicarboxylic acids such as diethyl-4,5-epoxycyclohexane-1,2-dicarboxylate,
dibutyl-1-methyl-4,5-epoxycyclohexane-1,2-dicarboxylate,
di-(2-ethylhexyl)-4,5-epoxycyclohexane-1,2-dicarboxylate,
di-(tridecyl)-4,5-epoxycyclohexane-1,2-dicarboxylate,
di-(2-ethylhexyl)-4,5-epoxy-3-methylcyclohexane-1,2-dicarboxylate;

$C_1$ to $C_{18}$ alkyl ethers of 3,4-epoxycyclohexane, particularly the $C_1$ to $C_6$ alkyl ethers; $C_1$ to $C_{18}$ alkyl ethers of 3,4-epoxycyclohexane methanol, particularly the $C_1$ to $C_6$ alkyl ethers; and $C_1$ to $C_{18}$ alkyl ketones of 3,4-epoxycyclohexane, particularly the $C_1$ to $C_6$ alkyl ketones.

Particularly preferred epoxy compounds that can be employed in the practice of the present invention are those 3,4-epoxycyclohexane carboxylates having the following structure:

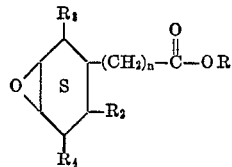

wherein $R_2$ is hydrogen, an alkyl of from 1 to about 9 carbon atoms, or a

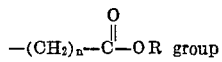 group $R_3$ and $R_4$ are individually hydrogen or an alkyl, of from 1 to about 4 carbon atoms, R is an alkyl of from 1 to about 18 carbon atoms and $n$ is an integer of from 0 to 3.

Representative examples of this class of epoxy compounds include $C_{1-4}$ alkyl-3,4-epoxycyclohexane carboxylate,
$C_{1-4}$ alkyl-3,4-epoxycyclohexyl methyl carboxylate,
$C_{1-4}$ alkyl-3,4-epoxycyclohexyl ethyl carboxylate,
$C_{1-4}$ alkyl-3,4-epoxycyclohexyl propyl carboxylate,
methyl-6-methyl-3,4-epoxycyclohexane carboxylate,
butyl-2,5-dimethyl-3,4-epoxycyclohexane carboxylate,
methyl-6-ethyl-3,4-epoxycyclohexyl methyl carboxylate,
butyl-6-isopropyl-3,4-epoxycyclohexyl ethyl carboxylate, and
methyl-6-isobutyl-3,4-epoxycyclohexane carboxylate.

Typical examples of the esters and amides of phosphorus which are suitable as base stocks for preparing the functional fluid compositions of this invention are those represented by the structure

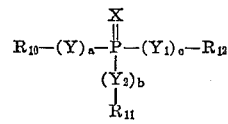

wherein Y is selected from the group consisting of oxygen, sulfur, and

$Y_1$ is selected from the group consisting of oxygen, sulfur, and

and $Y_2$ is selected from the group consisting of oxygen, sulfur, and

where X is selected from the group consisting of sulfur and oxygen and $a$, $b$, and $c$ are whole numbers having a value of 0 to 1 and the sum of $a+b+c$ is from 1 to 3 and $R_{10}$–$R_{15}$ are each individually selected from the group consisting of alkyl, alkoxyalkyl, aralkyl, aroxyalkyl, aryl, aroxyaryl, alkoxyaryl, and alkaryl radicals having up to about 18 carbon atoms and members of the above group further substituted with halogen. In general, it is preferred that $R_{10}$, $R_{11}$ and $R_{12}$ are alkyl, aryl, or alkaryl when Y, $Y_1$ and $Y_2$ are oxygen, and that $R_{10}$ through $R_{15}$ are alkyl when Y, $Y_1$ and $Y_2$ are

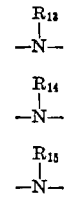

respectively.

The preferred phosphorus ester base stocks are hydrocarbon phosphates and include trialkyl phosphates, triaryl and/or alkyl substituted aryl phosphates and mixed aryl and/or substituted arylalkyl phosphates. With respect to the alkyl groups, it is preferred to have from about 2 to about 18 carbon atoms, more preferably from about 2 to about 12 carbon atoms and with respect to the aryl and substituted aryl groups, it is preferred to have from about 6 to about 16 carbon atoms and more preferably from about 6 to about 12 carbon atoms. Typical examples of preferred phosphates are dibutylphenyl phosphate, triphenyl phosphate, tricresyl phosphate, tributyl phosphate, tri-2-ethylhexyl phosphate, trioctyl phosphate and mixtures of the above phosphates, such as mixtures of tributyl phosphate and tricresyl phosphate and mixtures of isooctyldiphenyl phosphate and 2-ethylhexyldiphenyl phosphate and mixtures of trialkyl phosphates and tricresyl phosphates and the like.

The preferred amides of an acid of phosphorus are those compounds wherein $a$, $b$ and $c$ have a value of 1, $Y$ and $Y_1$ are selected from oxygen and

and

respectively and $Y_2$ is

These base stocks are referred to generically as amides of phosphorus and include phosphoroamidates, phosphorodiamidates and phosphorotriamidates. The preferred class of mono-, di- and triphosphoroamidates are the diaryl- and/or alkyl substituted-aryl-N,N-dialkylphosphoroamidates, aryl- and/or alkyl substituted-aryl-N,N-dialkyl-N',N'-dialkylphosphorodiamidates and the N,N-dialkyl - N',N' - dialkyl-N'',N''-dialkylphosphorotriamidates. With respect to the alkyl group, it is preferred to have from about 1 to about 18 carbon atoms, more preferably from about 1 to about 8 carbon atoms and with respect to the aryl and substituted-aryl group, it is preferred to have from 6 to about 16 carbon atoms, and preferably from 6 to about 12 carbon atoms. Examples of the amides of an acid of phosphorus, that is, mono-, di- and triamides of an acid of phosphorus, are phenyl-methyl-N,N-dimethylphosphoroamidate,
phenyl-methyl-N,N-di-n-butylphosphoroamidate,
mixtures of m-cresyl-p-cresyl-N,N-dimethylphosphoroamidate and
phenyl-p-cresyl-N,N-dimethylphosphoroamidate,
mixtures of m-cresyl-p-cresyl-N,N-dimethylphosphoroamidate,
di-m-cresyl-N,N-dimethylphosphoroamidate, and
di-p-cresyl-N,N-dimethylphosphoroamidate,
phenyl-N-methyl-N-butyl-N'-methyl-N'-butylphosphorodiamidate,
Phenyl-N,N-di-n-butyl-N',N'-di-n-butylphosphorodiamidate,
phenyl-N,N-dimethyl-N',N'-dimethylphosphorodiamidate,
N-methyl-N-butyl-N'-methyl-N'-butyl-N''-butylphosphorotriamidate,
N-methyl-N-butyl-N',N''-tetramethylphosphorotriamidate,
N-di-n-propyl-N',N''-tetramethylphosphorotriamidate and
N,N'-di-n-propyl-N''-dimethylphosphorotriamidate.

Useful fluids also include esters and amides of phosphorus wherein $R_{10}$ through $R_{15}$ as identified above are halogen substituted, particularly chloro or bromo substituted, and when an aryl radical is halogen substituted, it is preferred that the halogen occupy the meta position. Examples of such halogen substituted esters and amides of phosphorous are well known in the art.

Examples of di- and tricarboxylic acid esters which are suitable as base stocks are those compounds represented by the structure

wherein $o$, $o'$, $p$ and $p'$ each whole numbers having the value of 0 to 1 provided that the sum of each of $o+p$ and $o'+p'$ is 1; A is a whole number having a value of 1 to 2; $R_{20}$ and $R_{22}$ are each independently selected from alkyl, alkoxyalkyl, cycloalkyl, alkyl cycloalkyl, aralkyl, alkaryl and members of the above group further substituted by halogen and $R_{21}$ is selected from alkylene, alkenylene, phenylene and members of the above group further substituted by carboxy, carboalkoxy or acyloxy. It is preferred that $R_{20}$ and $R_{22}$ be alkyl having from about 2 to about 18 carbon atoms, more preferably from about 4 to about 14 carbon atoms and $R_{21}$ be alkylene having from about 2 to about 12 carbon atoms, more preferably from about 4 to about 10 carbon atoms.

Typical examples of di- and tricarboxylic acid esters are di(2-ethylhexyl) azelate, di(2-ethylhexyl) sebacate, diisooctyl sebacate, 2-ethylhexyl 3:5:5 trimethylhexyl sebacate, diisooctyl azelate, di(3:5:5 trimethylhexyl) sebacate, di(1-methyl-4-ethyloctyl) sebacate, diisodecyl azelate, diisotridecyl azelate, di(1-methyl-4-ethyloctyl) glutarate, di(2-ethylhexyl) adipate, di(3-methylbutyl) azelate, di(3:5:5 trimethylhexyl) azelate, di(2-ethylhexyl) adipate, di($C_{10}$ oxo) adipate, bis(diethylene glycol monobutyl ether) adipate, di(isooctyl/isodecyl) adipate, diisotridecyl adipate, triethylene glycol di(2-ethylhexanoate), hexanediol 1,6-di(2-ethylhexanoate) and dipropylene glycol dipelargonate. Additional examples are mixtures of esters made from an aliphatic dibasic acid and a technical mixture of alcohols such as a mixture of alcohols obtained by the oxo process.

Typical examples of polyesters which are suitable as base stocks are those compounds represented by the structure

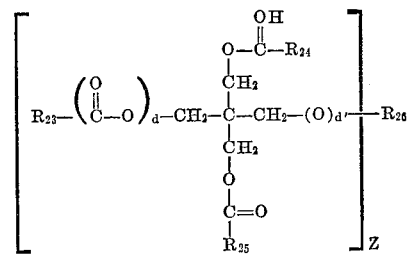

wherein $R_{23}$ is selected from the group consisting of hydrogen and alkyl, $R_{24}$ and $R_{25}$ are each selected from the group consisting of alkyl, alkoxyalkyl, cycloalkyl, alkyl cycloalkyl, aralkyl, aryl, alkylaryl and members of the above group further substituted with halogen, $d$ is a whole number having a value of 0 to 1, $d'$ is a whole number having a value of 0 to 1, Z is a whole number having a value of 1 to 4 and, when Z is 1, $d'$ is 0, and $R_{26}$ is acyloxy group containing from 3 to 12 carbon atoms and, when Z is 2 to 4, $d'$ is 1 and $R_{26}$ is acyl containing from 3 to 12 carbon atoms. It is preferred that $R_{23}$, $R_{24}$ and $R_{25}$ be alkyl having from about 2 to about 18 carbon atoms, more preferably from about 4 to about 10 carbon atoms and $R_{26}$ be acyloxy or acyl having from about 3 to about 12 carbon atoms, more preferably from about 4 to about 10 carbon atoms.

Typical examples of polyester compounds can be prepared by the reaction of an acid compound with a polyhydroxy compound which polyhydroxy compound can be trimethylolpropane, trimethylolethane, pentaerythritol, dipentaerythritol, tripentaerythritol and tetrapentaerythritol.

The acids which may be utilized are, for example, aliphatic monocarboxylic acids, alicyclic monocarboxylic aids, aromatic monocarboxylic acids and heterocyclic monocarboxylic acids, such as propionic, butyric, isobutyric, n-valeric, caproic, n-heptylic, caprilic, 2-ethylhexanoic, 2,2-dimethylheptanoic and pelargonic. Typical examples of esters of this type are trimethylolpropane, tri-n-pelargonate, trimethylolpropane tricaprate, trimethylolpropane tricaprylate, the trimethylolpropane triester of mixed octanoates, pentaerythrityl tetrabutyrate, pentaerythrityl tetravalerate, pentaerythrityl teracaproate, pentaerythrityle dibutyrate dicarproate, pentaerythrityl butyrate caproate divalerate, pentaerythrityl butyrate trivalerate, pentaerythrityl butyrate tricaproate, pentaerythrityl tributyrate caproate. Suitable dipentaerythrityl esters include dipentaerythrityl hexavalerate, dipentaerythrityl hexacaproate, dipentaerythrityl hexahydroate, dipentaerythrityl hexacaprylate, dipentaerythrityl tributyrate tricaproate, dipentaerythrityl trivalerate trinonylate, dipentaerythrityle mixed hexaesters of $C_{4-10}$ fatty acids.

Typical complex esters which are suitable as base stocks are represented by the structure

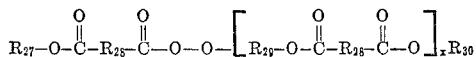

wherein $R_{27}$ and $R_{30}$ are each selected from the group consisting of hydrogen, alkyl, alkoxyalkyl, aralkyl, aryl, alkylaryl, cycloalkyl, alkyl cycloalkyl, $R_{28}$ and $R_{29}$ are each selected from the group consisting of alkyene, alkylene and members of the above group further substituted by acyloxy and hydroxyl, $x$ is a whole number having a value of 1 to about 80 or more.

It is preferred that $R_{27}$ and $R_{30}$ be alkyl having from about 3 to about 12 carbon atoms, more preferably from about 4 to about 10 carbon atoms and that $R_{28}$ and $R_{29}$ be alkylene or acyloxy substituted alkylene wherein the alkylene portion contains from about 2 to about 12 carbon atoms, more preferably from about 4 to about 8 carbon atoms and the acyloxy substituent contains from about 2 to about 12 carbon atoms.

Useful complex esters can be obtained by esterifying dicarboxylic acids with a mixture of monohydric alcohol and a glycol, or by polymerizing a dihydroxy compound with a dicarboxylic acid and reacting the terminal hydroxy and acid radical with a mixture of a monocarboxylic acid and a monohydric alcohol.

The mono-, di- and polyhydric alcohols, and the monocarboxylic acids employed in the preparation of the complex esters can also contain ether oxygen linkages.

Specific examples of useful complex esters are esters prepared from methylene glycol (1 mole), adipic acid (2 moles) and 2-ethylhexanol (2 moles); esters prepared from tetraethylene glycol (1 mole), sebacic acid (2 moles), and 2-ethylhexanol (2 moles); esters prepared from 2-ethyl-1,3-hexanediol (1 mole), sebacic acid (2 moles) and 2-ethylhexanol (2 moles); esters prepared from diethylene glycol (1 mole), adipic acid (2 moles) and n-butanol (2 moles); esters prepared from polyglycol 200 (1 mole), sebacic acid (2 moles) and ethylene glycol mono(2-ethylbutyl) ether (2 moles); esters prepared from sebacic acid (1 mole), tetraethylene glycol (2 moles) and caproic acid (2 moles); esters prepared from triethylene glycol (1 mole), adipic acid (1 mole), n-caproic acid (1 mole) and 2-ethylhexanol (1 mole); esters prepared from sebacic acid (1 mole), lactic acid (2 moles) and n-butanol (2 moles); esters prepared from tetraethylene glycol (1 mole), lactic acid (2 moles) and butyric acid (2 moles); complex esters prepared from neopentyl glycol (2 moles), dicarboxylic acids (1 mole) and monocarboxylic acids (2 moles) and complex esters prepared from neopentyl glycol (1 mole) dicarboxylic acids (2 moles) and monohydric neoalcohols, e.g., 2,2,4-trimethylpentanol (2 moles).

The above identified base stock materials comprise at least about 50 percent by weight of the functional fluids of the present invention. In addition to these base stock materials, the functional fluid may contain up to about 50 percent of one or more other base stock materials such as for example, silicate esters, silicones, fluids derived from coal products, and synthetic oils, e.g., alkylene polymers and oligomers (such as polymers of propylene, butylene, etc., and the mixtures thereof), alkylene oxide-type oligomers and polymers (e.g., propylene oxide polmers) and derivatives, including alkylene oxide oligomers and polymers prepared by polymerizing the alkylene oxide in the presence of water or alcohols, e.g., ethyl alcohol, alkyl benzenes (e.g., mono alkylbenzene such as dodecyl benzene, tetradecylbenzene, etc.) and dialkylbenzenes (e.g., n-nonyl-2-ethyl hexylbenzene); polyphenyls (e.g., biphenyls and terphenyls), halogenated polyphenyls, particularly chloro and bromopolyphenyls, hydrocarbon oils including mineral oils derived from petroleum sources and synthetic hydrocarbon oils, examples of which are mineral oils having a wide range of viscosities and volatilities such as naphthenic base, paraffinic base and mixed base mineral oils; synthetic hydrocarbon oils and oils derived from high-alpha-olefins of from 8 to 20 carbon atoms by acid catalyzed dimerization and by oligomerization; halogenated benzene, halogenated lower alkylbenzene and monohalogenated diphenyl ethers.

All these materials are known and have been used as hydraulic fluids or components of hydraulic fluids. Although it is not permissible to employ these materials in major amounts in fluid compositions of the instant invention, these other base stock materials may be used singly or in combinations as a minor component of the total base stock present in amounts of less than about 50 percent by weight.

In addition to the base stock materials and the monoepoxycyclohexyl compound, the fluids of the instant invetnion may also contain one or more base stock modifiers. As used herein, "base stock modifier" means any material which when added to the base stock effects a determinable change in the chemical or physical properties of the base stock. Examples of typical classes of such modifiers which are widely used in formulating hydraulic and other functional fluids include dyes, pour point depressants, antioxidants, antifoam agents, viscosity index improvers such as polyalkyl acrylates, polyalkyl methacrylates, polycyclic polymers, polyurethanes, polyalkylene oxides and polyesters, lubricity agents and water.

The preferred polymeric viscosity index improvers which may be employed in the compositions of this invention are the polymers of alkyl esters of unsaturated monocarboxylic acids having the formula

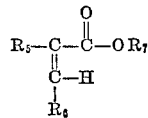

wherein $R_5$ and $R_6$ are each individually hydrogen or a $C_1$ to about $C_{10}$ alkyl group, and $R_7$ is a $C_1$ to about $C_{12}$ alkyl group. Illustration of the alkyl groups represented by $R_5$, $R_6$ and $R_7$ within their definitions as given above are for example methyl, ethyl, propyl, butyl, t-butyl, isopropyl, 2-ethylhexyl, hexyl, decyl, undecyl, dodecyl and the like. These polymers include, for example, poly(butylmethacrylates), poly(hexylmethacrylates), poly(octylacrylates), poly(dodecylacrylates) and polymers wherein the ester is a mixture of compounds obtained by esterifying the $\alpha$-$\beta$ unsaturated monocarboxylic acid with a mixture of monoalcohols containing from 1 to 12 carbon atoms.

The polyalkylmethacrylates and acrylates suitable for the purpose of this invention are in general those resulting from the polymerization of alkylmethacrylates or alkylacrylates in which the alkyl groups have from 4 to 12 carbon atoms. The alkyl groups may be mixtures such as derived from a mixture of alcohols in which case there may be included some alkyl groups having as low as 2 carbon atoms and as high as about 18 carbon atoms. The number of carbon atoms in the alkyl group should preferably be such that the polymer is compatible with the particular fluid used. Usually it will be satisfactory for the alkyl group of the methacrylate polymer to be from about 4 to 10 carbon atoms. The alkyl group may be branched chain or isoalkyl, but it is preferably normal alkyl. The molecular weight of the polymerized alkylmethacrylate can be from 15,000 to about 40,000 or the viscosity index improver can be a mixture of one or more polymers having different average molecular weights. For example, a mixture of a polymer having average molecular weight of from 2,000 to 12,000 with one having an average molecular weight of from 15,000 to 40,000. The total amount of viscosity index improver employed in the compositions of the instant invention can range from about 2 to about 20 parts per 100 parts of the total composition.

Other compositions which are found to be useful as viscosity index improvers for the functional fluids of this invention are polymers of polyalkylene oxides, particularly polymers of propylene oxide and butylene oxide having molecular weights in the range of from about 1,000 to about 4,500. Specific examples of such useful V.I. improvers are the polymer of polypropylene oxide having a molecular weight of about 4,000, and the polymer of polybutylene oxide having a molecular weight of about 2,500. Polymers of alkylene oxide are items of commerce sold for a variety of uses including lubricants, plasticizers, solvents, coupling agents, thickeners, frothing and defrothing agents, and hydraulic fluids.

In a preferred embodiment of the present invention the functional fluid compositions comprise at least about 50 percent by weight of a phosphate ester or mixture of phosphate esters represented by the structure

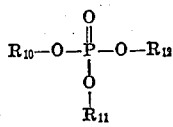

wherein $R_{10}$, $R_{11}$, and $R_{12}$ are hydrocarbon radicals selected from the group consisting of alkyl, alkoxyalkyl, aralkyl, aroxyalkyl, aryl, aroxyaryl, alkoxyaryl, alkaryl, and mixtures thereof and halogenated and alkyl-substituted members thereof having up to about 18 carbon atoms, and from about 0.1 to 10 percent by weight of an epoxy compound as hereinbefore defined. In addition to the phosphate ester and epoxy compound, these preferred fluid compositions can also contain certain additives as hereinbefore defined and can also contain minor amounts, e.g., less than about 50 percent by weight of one or more other base stock compositions as hereinbefore defined.

Particularly preferred functional fluids compositions comprise at least about 65 percent by weight of such phosphate esters and less than about 35 percent by weight of other materials including base stocks and base stock modifiers, and even more preferably contain at least about 80 percent by weight of such phosphate esters and less than about 20 percent by weight of other materials. Particularly preferred phosphate esters for use in the compositions of this invention are dialkylaryl phosphates wherein the alkyl radicals have 1 to 18 carbon atoms, e.g., dibutylphenyl phosphate, and mixtures of trialkyl phosphate and triaryl phosphate such as 88/12 tributyl phosphate/tricresyl phosphate.

The excellent performance of the epoxy additives defined by the present invention as compared to those of the prior art in representative phosphate ester based hydraulic fluids is illustrated by the following data:

In the preceding tests, equivalent amounts of epoxide as determined by oxirane analysis were used except for Tests 5 and 7. The stability of fluid to oxidation and acid buildup was determined by maintaining the fluid at 275° F. and periodically titrating samples of the fluid to monitor the acid buildup. A titratable acid number (TAN) of 0.50 was taken as the end point, and the number of hours required for the fluid to reach this level of acid content was recorded as the acid buildup figure.

Shaft seal leakage data was obtained by circulating the fluid in a closed loop through a Type APL-10V-7B aircraft hydraulic pump operated at 3600 r.p.m. and at a fluid temperature of 225° F. and pressure of 30 p.s.i.g. The shaft seal rotor was constructed of Type 440 stainless steel while the stator was of sintered bronze. The fluid leaking from around the pump shaft was collected and weighed and the data reported as grams collected/hours of test. The predetermined test period was 200 hours minimum unless significant leakage justified premature termination.

It is apparent from the above data that the monoepoxides used in the samples which are representative of the class of compounds encompassed by the instant invention are unique in providing functional fluid compositions capable of operating without any or with only very slight shaft seal leakage during the test period, whereas the diepoxide controls of Tests 4 and 7 which are representative preferred inhibitors of the prior art resulted in considerable leakage and in the case of Test 4, premature test termination. Accordingly, the data illustrate the compositions of this invention are superior to those of prior art and represent a significant advance in the state of the art relating to the stabilization of functional fluid compositions.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. A hydraulic fluid composition comprising
   (A) at least about 50 percent by weight of a base stock material selected from the group consisting of esters and amides of an acid of phosphorus, di- or tricarboxylic acid esters, esters of polyhydric compounds, and mixtures thereof, and
   (B) from about 0.1 to 10 percent by weight of an epoxide compound represented by the structure

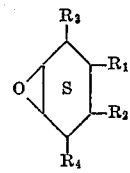

TABLE

| Test No. | Base fluid | Percent | Epoxide | Oxirane content | Acid buildup [1] | Shaft seal leakage [2] |
|---|---|---|---|---|---|---|
| 1 | A | 3.4 | Methyl-3,4-epoxycyclohexane carboxylate | 0.35 | 400 | 0/236 |
| 2 | A | 3.8 | 3,4-epoxycyclohexylmethyl acetate | 0.35 | 330 | 1.8/239 |
| 3 | A | 4.85 | Dimethyl-4,5-epoxycylohexyl-1,2-dicarboxylate | 0.35 | 350 | 0/213 |
| 4 | A | 3.1 | 3,4-epoxycyclohexylmethyl-3,4-epoxycyclohexane carboxylate | 0.35 | 550 | 1,106/125 |
| 5 | B | 1.75 | Methyl-3,4-epoxycyclohexane carboxylate | 0.19 | >300 | 0/236 |
| 6 | B | 4.2 | n-Butyl-3,4-epoxycyclohexane carboxylate | 0.35 | >450 | 0/200 |
| 7 | B | 6.9 | 3,4-epoxycyclohexylmethyl-3,4-epoxycyclohexane carboxylate | 0.78 | ---- | 15/202 |

[1] Acid buildup, hours to 0.50 titratable acid number (TAN).
[2] Shaft seal leakage, grams of fluid/hours of test.

NOTE.—Base fluid A: 94.2% dibutylphenyl phosphate; 5.1% polyalkylmethacrylate polymer V.I. improver; 0.5% 1,2-bis(phenylmercapto)ethane, 0.2% water. Base fluid B: 80.5% tributyl phosphate; 11.0% tricresyl phosphate; 7.7% polyalkylacrylate polymer V.I. improver; 0.5% 1,2-bis(phenylmercapto)ethane; 0.3% water.

wherein $R_1$ is $-(CH_2)_{0-3}-C(O)OR$, $-C(O)R$, $-OR$, or $-CH_2OR$ where R is an alkyl radical having from 1 to about 12 carbon atoms, $R_2$ is $R_1$, hydrogen, or an alkyl radical having from 1 to about 9 carbon atoms, and $R_3$ and $R_4$ are individually hydrogen or an alkyl radical having from 1 to about 4 carbon atoms.

2. A composition of claim 1 wherein the epoxide compound is a 3,4-epoxycyclohexane carboxylate having the following structure

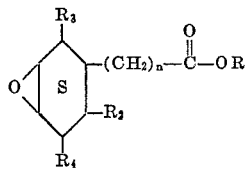

wherein $R_2$ is hydrogen, an alkyl of from 1 to about 9 carbon atoms, or a

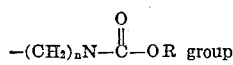

$R_3$ and $R_4$ are individually hydrogen or an alkyl of from 1 to about 4 carbon atoms, R is an alkyl of from 1 to about 18 carbon atoms and $n$ is an integer of from 0 to 3.

3. A composition of claim 2 wherein the base stock material is a phosphate ester represented by the structure

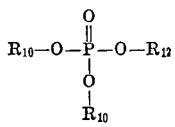

wherein $R_{10}$, $R_{11}$ and $R_{12}$ are hydrocarbon radicals selected from the group consisting of alkyl, alkoxyalkyl, aralkyl, aroxyalkyl, aryl, aroxyaryl, alkoxyaryl, alkaryl, and mixtures thereof and halogenated and alkyl-substituted members thereof having up to about 18 carbon atoms.

4. A composition of claim 3 wherein $R_{10}$ and $R_{11}$ are $C_{1-18}$ alkyl radicals and $R_{12}$ is a $C_{6-18}$ aryl radical.

5. A composition of claim 3 wherein the phosphate ester is dibutylphenylphosphate.

6. A composition of claim 5 wherein the epoxide compound is $C_{1-4}$ alkyl-3,4-epoxycyclohexane carboxylate.

7. A composition of claim 5 wherein the epoxide compound is $C_{1-4}$ alkyl-3,4-epoxycyclohexyl methyl carboxylate.

8. A composition of claim 3 wherein the phosphate ester is a mixture of tributyl phosphate and tricresyl phosphate.

9. A composition of claim 8 wherein the epoxide compound is $C_{1-4}$ alkyl-3,4-epoxycyclohexane carboxylate.

10. A composition of claim 8 wherein the epoxide compound is a $C_{1-4}$ alkyl-3,4-epoxycyclohexyl methyl carboxylate.

11. A hydraulic fluid composition comprising a composition of claim 3 and from about 2 to 20 percent by weight of a viscosity index improver which is a polymer of an ester having the structure

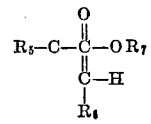

wherein $R_5$ and $R_6$ are each individually hydrogen or a $C_1$ to about $C_{10}$ alkyl group, and $R_7$ is a $C_1$ to about $C_{12}$ alkyl group.

12. A hydraulic fluid composition comprising a composition of claim 3 and from about 2 to 20 percent by weight of a viscosity index improver which is a polymer of an alkylene oxide having a polymeric molecular weight of from about 1,500 to 4,500.

13. In a method of operating a hydraulic pressure device wherein a displacing force is transmitted to a displaceable member by means of a hydraulic fluid, the improvement which comprises employing as said fluid a composition of claim 1.

14. In a method of operating a hydraulic pressure device wherein a displacing force is transmitted to a displaceable member by means of a hydraulic fluid, the improvement which comprises employing as said fluid a composition of claim 11.

References Cited

UNITED STATES PATENTS

| 2,794,029 | 5/1957 | Phillips et al. | 260—348 C |
| 2,794,030 | 5/1957 | Phillips et al. | 260—348 C |
| 2,794,812 | 6/1957 | Phillips et al. | 260—348 C |
| 2,963,490 | 12/1960 | Rowland et al. | 260—348 C |
| 3,223,715 | 12/1965 | Kraft et al. | 260—348 C |
| 3,637,507 | 1/1972 | Gentit | 252—78 |

LEON D. ROSDOL, Primary Examiner

H. A. PITLICK, Assistant Examiner

U.S. Cl. X.R.

252—49.8, 49.9, 57, 73, 79, 396, 407; 260—348 C

UNITED STATES PATENT OFFICE
CERTIFICATE OF CORRECTION

Patent No. 3,723,320　　　　　　　　　Dated March 27, 1973

Inventor(s) John F. Herber, Robert W. Street and William R. Richard,

It is certified that error appears in the above-identified patent and that said Letters Patent are hereby corrected as shown below:

Column 11, lines 21-23, "$-(CH_2)_n\overset{O}{\underset{\|}{N-C}}-OR$ group" should be ---

$-(CH_2)_n-\overset{O}{\underset{\|}{C}}-OR$ group ---

Column 11, lines 28-32, "$R_{10}-O-\overset{\overset{O}{\|}}{\underset{\underset{R_{10}}{|}}{P}}-O-R_{12}$" should be ---

$R_{10}-O-\overset{\overset{O}{\|}}{\underset{\underset{R_{11}}{|}}{P}}-O-R_{12}$ ---

Signed and sealed this 27th day of November 1973.

(SEAL)
Attest:

EDWARD M. FLETCHER, JR.　　　　　　　RENE D. TEGTMEYER
Attesting Officer　　　　　　　　　　Acting Commissioner of Patents